Aug. 25, 1959
W. H. ISELY
2,901,744
BREAKAWAY COMPUTER
Filed Feb. 12, 1957
2 Sheets-Sheet 1
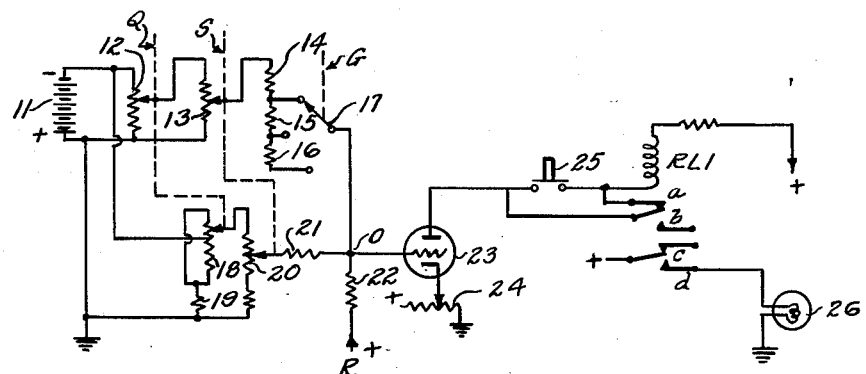
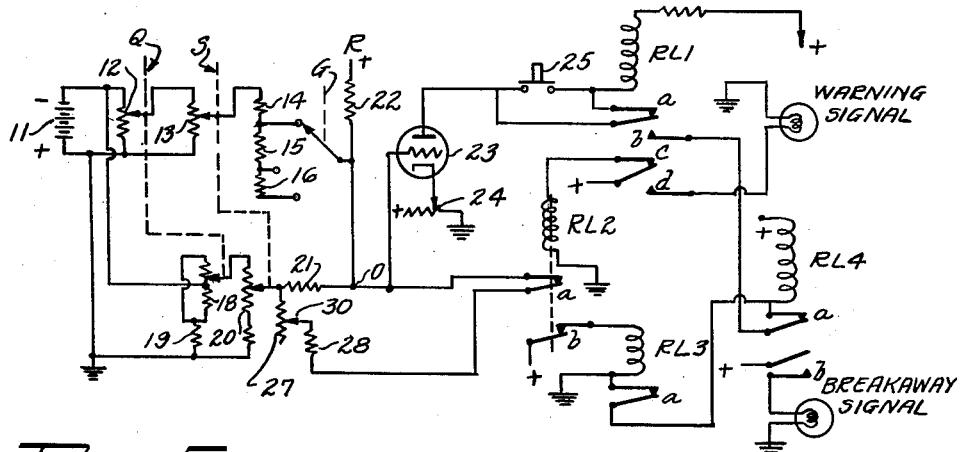
INVENTOR.
WILLIAM H. ISELY Aug. 25, 1959 W. H. ISELY 2,901,744
BREAKAWAY COMPUTER
Filed Feb. 12, 1957 2 Sheets-Sheet 2

INVENTOR.
WILLIAM H. ISELY

United States Patent Office 2,901,744
Patented Aug. 25, 1959

2,901,744

BREAKAWAY COMPUTER

William H. Isely, Cocoa Beach, Fla., assignor, by mesne assignments, to the United States of America as represented by the Secretary of the Air Force Application February 12, 1957, Serial No. 639,838

2 Claims. (Cl. 343—7)

It is the object of this invention to provide a circuit which computes breakaway information for the pilot of an aircraft in an air-to-ground attack. While air-to-ground breakaway computers have been utilized in the past, such computers give reliable information only over smooth terrain. The computer described herein permits accurate breakaway computation over rough terrain provided vertical pull-out is used. A warning signal is given to the pilot at breakaway and, if desired, also at a variable preset time before breakaway.

The computer operates in conjunction with a vertically scanning radar on the aircraft which continuously determines the range to the terrain as a function of the vertical beam angle. The computer is synchronized with the scanner and continuously computes the distance from the aircraft to a predetermined pull-out path. These two distances are compared and a warning signal is given when they become equal. The pull-out path is defined far enough in front of the aircraft to provide a suitable factor of safety. Where a warning is to be given a preset time before breakaway another similar pull-out path is defined in front of the breakaway pull-out path. The computer operates first with respect to the more distant path and after the advance warning signal is given for this path automatically switches to operation with respect to the nearer path.

A more detailed description of the invention will be made in connection with the specific embodiments thereof shown in the accompanying drawings, in which Fig. 1 is a block diagram of the complete system;

Fig. 4 is a schematic diagram of a breakaway computer giving a breakaway signal only; and Fig. 5 is a schematic diagram of a computer giving a warning signal a predetermined time interval before the breakaway signal.

Figure 2:
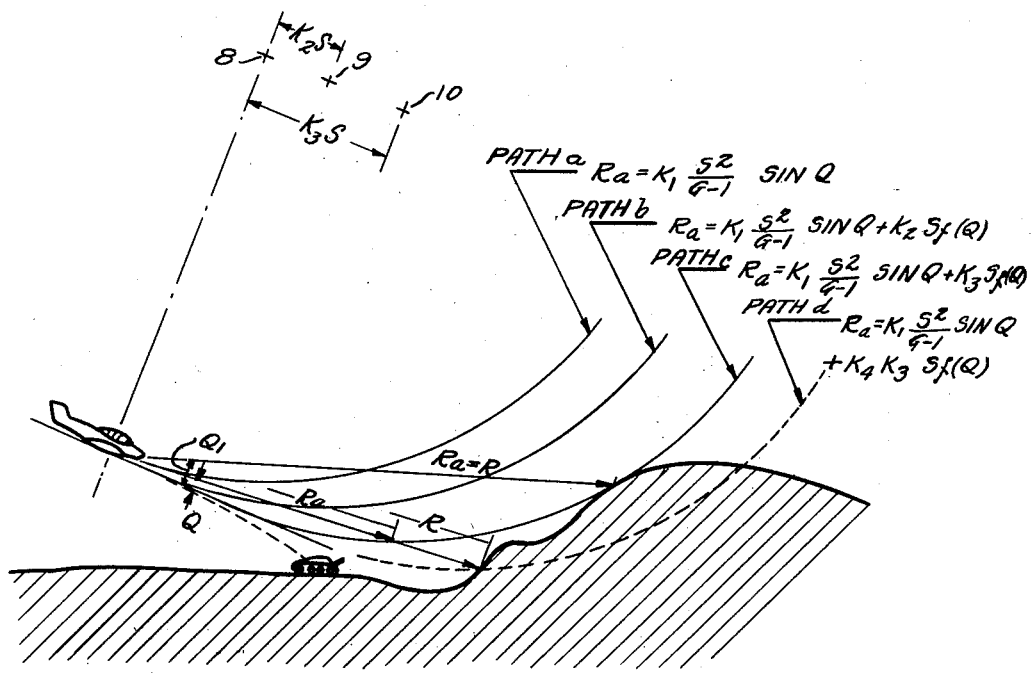
Fig. 2 illustrates the geometry of the problem.

Referring to Fig. 1, the aircraft carries a radar transmitter 1 which applies periodic pulses of high frequency energy through transmit-receive network 2 to a directional antenna 3. The antenna block 3 is assumed to include in addition to the antenna all the necessary apparatus, electrical or mechanical, for causing the beam of the antenna to scan in a vertical plane containing the longitudinal axis of the aircraft. This scanning takes place over a vertical angle measured upward from the longitudinal axis of the aircraft and of sufficient magnitude that the antenna beam will be able to scan over all of the possibly interfering terrain even at the steepest dive angle of the aircraft. The elevation of the scanning beam above the longitudinal axis of the aircraft at any instant in the scanning cycle is represented by the angle Q. Received echo pulses travel through T.-R. network 2 to receiver 4 and the resulting video output of this receiver is applied to range voltage generator 5 which produces a direct voltage proportional to the instantaneous range. Apparatus performing the functions of elements 1—5 are well known in the art and need not be described in detail. These elements may be those of the existing aircraft fire control radar. With respect to element 5, the radar supplies range information in the form of a time interval—the time interval between the transmitted pulse and the received echo. This is not a form suitable for use in a computer. The circuit 5 is therefore interposed to convert this time interval into a proportionate continuous direct voltage. This is usually accomplished by sampling the amplitude of a linear sawtooth of voltage initiated at the time of the transmitted pulse. The sampling occurs at the time of the received echo, the amplitude of the sawtooth at that instant being proportional to the time interval between the transmitted pulse and the echo and therefore proportional to range. By integrating the samplings a continuous direct voltage having an amplitude proportional to range is produced. As the radar antenna scans in the vertical sector this voltage varies with range to the terrain. The computer 6, to which this invention relates and which will be described in detail later, is synchronized with the scanning of the antenna and continuously generates a direct voltage as a function of the beam angle Q that is proportional to the distance from the aircraft to the breakaway pull-out path or to the path used for the preliminary warning signal as the case may be. This voltage is compared with the range voltage from element 5 and signaling device 7 activated when the two voltages become equal.

The geometry of the problem is illustrated in Fig. 2. If the aircraft executes a vertical pull-out from the position shown it will follow very closely the circular path $a$ centered at point 8. The distance $R_a$ from the aircraft to the path $a$ along a line Q degrees above the aircraft axis is (1) $$R_a = K_1 \frac{S^2}{G-1} \sin Q$$

where $S$ = true air speed
$G$ = desired pull-out $g$
$Q$ = antenna beam angle, and
$K_1$ = a constant dependent upon the units in which the parameters are expressed.

Figure 3:
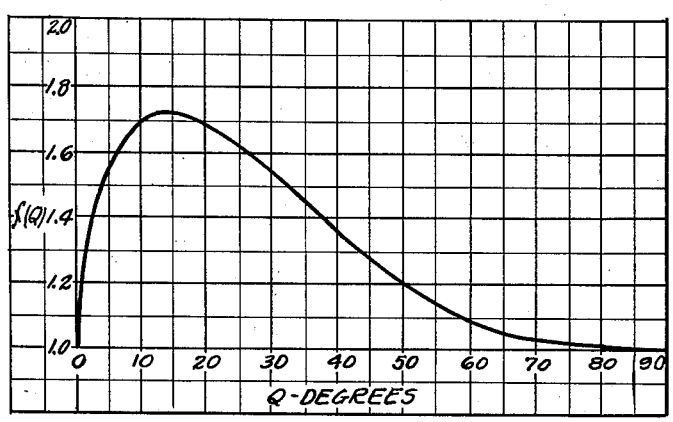
Fig. 3 shows the function $f(Q)$ used in computing the pull-out path.

In practice, with pilot, computer, radar scanning and airplane time lags, a delay of $K_2S$ will ensue before pull-out is started so that the aircraft will follow the circular path $b$ centered at 9. For this situation the distance from the aircraft to the path $b$ in the direction Q is given by (2) $$R_a = K_1 \frac{S^2}{G-1} \sin Q + K_2 S f(Q)$$

where $K_2$ is a constant depending upon the units used, time lags and probable computer errors and the function $f(Q)$ is that given in Fig. 3.

In order to allow a factor of safety the computer is designed to operate with path $c$, centered at 10, to which the following equation applies:

(3) $$R_a = K_1 \frac{S^2}{G-1} \sin Q + K_3 S f(Q)$$

In this equation $K_3$ is a constant depending upon the same factors as $K_2$ and the desired safety factor.

In order to provide a warning prior to the recurrence of the breakaway signal an additional path $d$, shown broken in Fig. 2, may be defined by the following equation:

(4) $\quad R_a = K_1 \dfrac{S^2}{G-1} \sin Q + K_4 K_3 Sf(Q)$ where $K_4$ is a constant greater than unity and dependent upon the desired time interval between warning and breakaway signals. In this case the computer gives a warning signal when $R = R_a$ for path $d$ and is then automatically adjusted to give a breakaway signal when $R = R_a$ for path $c$.

A circuit giving a breakaway signal only in accordance with path $c$ and Equation 3 is shown in Fig. 4. The circuit is energized from a source 11 of negative direct voltage. Potentiometer 12, potentiometer 13 and resistors 14, 15 and 16 generate a negative voltage at point O proportional to the expression $$K_1 \dfrac{S^2}{G-1} \sin Q$$

in Equation 3. Potentiometer 12, driven from the scanning apparatus in accordance with the beam angle Q, has its resistance so distributed as to introduce the factor $\sin Q$. Potentiometer 13 is driven in accordance with true air speed S and has its resistance so distributed as to introduce the factor $S^2$. Resistors 14, 15, 16 and switch arm 17 serve to introduce the factor $$\dfrac{1}{G-1}$$

for three values of G, the pull-out acceleration. The constant $K_1$ is introduced by the value of voltage of source 11. To produce a negative voltage at point O proportional to the term $K_3Sf(Q)$ of Equation 3, potentiometer 18 together with resistor 19 introduce the factor $f(Q)$; linear potentiometer 20, driven in accordance with S, introduces the factor S; and the constant $K_3$ is introduced by resistor 21. The total voltage applied to point O is therefore a negative voltage proportional to $R_a$ as expressed in Equation 3.

A positive voltage proportional to the instantaneous value of range R is also applied to point O through resistor 22. This voltage is supplied by the range voltage generator (Fig. 1). The effect of this is to make the voltage between point O and ground equal to the algebraic sum of the negative voltage proportional to $R_a$ and the positive voltage proportional to R. Therefore, by proper adjustment of the circuit parameters, the voltage of point O relative to ground may be made zero when $R_a = R$. The bias of tube 23 is adjusted by potentiometer 24 to such value that $RL_1$ releases when a decreasing potential at point O reaches zero.

When the computer of Fig. 4 is placed in operation, R will necessarily be greater than $R_a$ and the potential of point O will be above ground potential. Momentary depression of button 25 under these conditions energizes relay $RL_1$ which holds at contacts $a$. As the decreasing R approaches $R_a$, which remains constant for any given value of Q, the potential of point O decreases reducing the grid potential of tube 23 and therefore the anode current. When R becomes equal to $R_a$ at any value of Q the potential of point O becomes zero and $RL_1$ releases closing contacts $d$ and energizing breakaway indicator lamp 26.

The computer of Fig. 5 is designed to give a warning signal in accordance with path $d$ (Fig. 1) and Equation 4 a predetermined time interval before the breakaway signal is given in accordance with path $c$ and Equation 3. The only difference between Equation 4 and Equation 3 is that constant $K_3$ of Equation 3 is replaced by constant $K_4K_3$ in Equation 4. The computer of Fig. 5 first operates in accordance with Equation 4 by shunting resistor 21 with series resistors 27 and 28 to change the constant $K_3$ to the constant $K_4K_3$. Operating in this mode warning light 26 is energized when R becomes equal to $R_a$ for path $d$. When this occurs contacts $a$ of $RL_2$ open removing shunt resistors 27 and 28 from the circuit and adapting the computer for operation in accordance with path $c$ as in Fig. 4. As R continues to decrease it eventually becomes equal to $R_a$ for path $c$, at which time $RL_4$ is released energizing breakaway signal lamp 29 through contacts $b$. The time interval between warning and breakaway signals may be adjusted by varying the amount of resistance in shunt to resistor 21. This may be done by adjustable contact 30.

Considering the operation of Fig. 5 in more detail, a voltage proportional to $R_a$ is produced at point O in the same manner as explained for Fig. 4. This voltage is with respect to path $d$ and Equation 4 when resistor 21 is shunted by series connected resistors 27—28 and is with respect to path $c$ and Equation 3 when the shunt resistors are removed from the circuit. As stated for Fig. 4, R is necessarily greater than $R_a$ when computer operation is initiated. Under this condition the potential of point O is above ground and tube 23 conducts when button 25 is momentarily depressed. This conduction actuates $RL_1$ which holds at contacts $a$. Also, closure of contacts $c$ of $RL_1$ energizes $RL_2$ which connects resistors 27—28 across resistor 21 through contacts $a$ and energizes $RL_3$ through contacts $b$. Energization of $RL_3$ energizes $RL_4$ through contacts $a$. The computer is therefore conditioned for operation in accordance with path $d$ and Equation 4 with both lamps 26 and 29 deenergized.

When R becomes equal to $R_a$ for path $d$ $RL_1$ releases, energizing warning lamp 26 at contacts $d$. Release of $RL_1$ also releases $RL_2$ at contacts $c$ which opens contacts $RL_2a$ removing resistors 27—28 from across resistor 21. Since the computer is now operating on path $c$, point O is above ground and conduction is established through the coil of $RL_4$, contacts $RL_4a$, contacts $RL_1b$, tube 23 and resistor 24 to ground. Release of $RL_2$ also deenergizes $RL_3$ at contacts $b$, however, the opening of contacts $a$ of this relay is delayed until the above described circuit from the coil of $RL_4$ through tube 23 has been established. When R has decreased to equality with $R_a$ for path $c$ $RL_4$, which has the same release current value as $RL_1$, releases, energizing breakaway signal lamp 29 through contacts $b$.

I claim:

1. In combination with vertically scanning apparatus on an aircraft for continuously measuring the range from the aircraft to the terrain over a predetermined vertical angle measured upward from the longitudinal axis of the aircraft, means synchronized with said range measuring apparatus for continuously computing the distance in the direction of the instantaneous range measurement from the aircraft to a predetermined pull-out path situated a predetermined distance in advance of the aircraft in the plane of said sector and moving at the speed of the aircraft, means for comparing the instantaneous value of said distance with the corresponding instantaneous value of range, and means for giving an indication when the compared values are equal.

2. In combination with vertically scanning apparatus on an aircraft for continuously measuring the range from the aircraft to the terrain over a predetermined vertical angle measured upward from the longitudinal axis of the aircraft, means synchronized with said range measuring apparatus for continuously computing the distance in the direction of the instantaneous range measurement from the aircraft to a first predetermined pull-out path situated a predetermined distance in advance of the aircraft in the plane of said sector and moving at the speed of the aircraft, means for comparing the instantaneous value of said distance with the corresponding instantaneous value of range, means operative when the compared values are equal for giving an indication and for modifying said distance computing means to continuously compute the distance in the direction of the instantaneous range measurement from the aircraft to a second pull-out path similar to said first path but situated between said aircraft and said first path in the plane of said sector, means for comparing the instantaneous value of said distance to said second path with the corresponding instantaneous value of range, and means for giving an indication when the last two compared values are equal.

References Cited in the file of this patent
UNITED STATES PATENTS
2,736,878     Boyle _____ Feb. 28, 1956